United States Patent
Wild et al.

(10) Patent No.: US 7,641,586 B2
(45) Date of Patent: Jan. 5, 2010

(54) AUTOMATIC GEARBOX WITH INFINITELY-VARIABLE RATIO

(75) Inventors: Horst Wild, Engelthal (DE); Klaus Wohlrab, Weissenburg (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 337 days.

(21) Appl. No.: 10/580,757

(22) PCT Filed: Dec. 3, 2004

(86) PCT No.: PCT/EP2004/013739

§ 371 (c)(1),
(2), (4) Date: May 26, 2006

(87) PCT Pub. No.: WO2005/054719

PCT Pub. Date: Jun. 16, 2005

(65) Prior Publication Data

US 2007/0015625 A1   Jan. 18, 2007

(30) Foreign Application Priority Data

Dec. 8, 2003   (DE) ................ 103 57 239

(51) Int. Cl.
*B60W 10/04* (2006.01)
*B60W 10/10* (2006.01)

(52) U.S. Cl. ............... 477/37; 477/43; 477/44; 477/46

(58) Field of Classification Search ............ 477/37, 477/43, 44, 46
See application file for complete search history.

(56) References Cited

U.S. PATENT DOCUMENTS

| 4,704,683 A | * | 11/1987 | Osanai ............... 701/51 |
| 4,836,056 A | | 6/1989 | Nakawaki et al. |
| 5,860,891 A | | 1/1999 | Bauerle |
| 5,947,861 A | | 9/1999 | Nobumoto |
| 6,086,506 A | | 7/2000 | Petersmann et al. |
| 2001/0003108 A1 | * | 6/2001 | Goi et al. ............ 475/208 |

FOREIGN PATENT DOCUMENTS

| DE | 41 20 540 | 11/1992 |
| DE | 42 39 133 | 12/1993 |
| DE | 196 45 975 | 6/1997 |
| DE | 196 11 431 | 9/1997 |
| EP | 0 978 410 | 2/2000 |
| FR | 2 760 060 | 8/1998 |
| JP | 5-332426 | 12/1993 |

OTHER PUBLICATIONS

"Multitronic—das neue Automatikgetriebe von Audi" ("Multitronic—the new automatic gearbox of Audi"), ATZ Automobiltechnische Zeitschrift 102 (2000) 7/8, 9 (ATZ Automobile technical magazine, 2000, edition 7/8 and 9).

* cited by examiner

*Primary Examiner*—Sherry L Estremsky
*Assistant Examiner*—Edwin A. Young
(74) *Attorney, Agent, or Firm*—W. F. Fasse; W. G. Fasse

(57) ABSTRACT

A motor vehicle automatic gearbox, with infinitely-variable ratio, may be operated in a constant speed mode, or in an acceleration mode in which the motor revolution speed is increased or reduced in steps.

14 Claims, 3 Drawing Sheets

AUTOMATIC GEARBOX WITH INFINITELY-VARIABLE RATIO

FIELD OF THE INVENTION

The invention relates to an automatic gearbox, for a motor vehicle, with infinitely-variable ratio, which may be operated in a constant speed mode, or an acceleration mode.

BACKGROUND INFORMATION

Infinitely-variable gearboxes, which are also called CVT-gearboxes (continuously variable transmission), are based on the principle of belt drives, in which the transmission ratio between the shortest and longest transmission ratio is infinitely-variable with the aid of a so-called variator. An infinitely-variable ratio of this type is best suitable for an optimum exploitation of the torque produced by the engine. As the ratio is infinitely-variable, an adequate ratio is always provided for an efficiency-oriented driving characteristic, but also for a consumption-oriented or sporty driving characteristic, in which the engine can work in the optimum operating range.

The variator consists of two pairs of cone pulleys, the primary set of pulleys and the secondary set of pulleys as well as of an enlacement means, which for instance can be formed as a plate link chain and which serves as a force transmission element. The primary set of pulleys is driven by the engine, the engine torque is transferred via the chain to the secondary set of pulleys and is guided into the axle drive. One cone pulley each is moveable on a shaft, whereby the run diameter of the chain and thus the ratio is infinitely-variable. The changes of the ratio are made jerk-free and without any interruption of the tractive force.

An automatic gearbox with the above discussed general conventional features is described in the article "Multitronic—the new automatic gearbox of Audi" (ATZ Automobile technical magazine, 2000, edition 7/8 and 9). This CVT-gearbox can be operated either in a constant speed mode, or in an acceleration mode. In the constant speed mode depending on the driving situation a fixed desired revolution speed is predetermined, which depends for example on the speed or the inclination.

In the acceleration mode with a constant position of the acceleration pedal the desired revolution speed is continuously increased, the rise of the increase being dependent on the driving situation. The driver can effect infinitely-variable increases or the reduction of the revolution speed, respectively, via the change of the angle of the acceleration pedal. If the gearbox is operated in the acceleration mode, the speed of the driving motor in the speed follow-up is continuously increased in infinitely-variable manner. Although this gearbox has proved itself in practice, it is partially considered to be disadvantageous that the gearbox behaves different in the acceleration mode than conventional stepped automatic transmissions.

SUMMARY OF THE INVENTION

It is, therefore, the object of the invention to create a gearbox, which conveys an improved driving experience.

With an automatic gearbox of the type mentioned above this object is achieved according to the invention in that the revolution speed in the acceleration mode can be increased or reduced in steps.

Different from the conventional gearbox, in which all changes of the revolution speed in the acceleration mode take place in infinitely-variable manner, the revolution speeds according to the invention are predetermined so as to create a similar impression as with a gearbox having shifting steps. If the driver triggers a change of the revolution speed by more or less strongly activating the acceleration pedal in the acceleration mode, then the transition to the new revolution speed is effected by a jump or leap of the revolution speed, which is effected within a very short time interval. In this way the infinitely-variable automatic gearbox according to the invention reacts like a manually shifted gearbox or an automatic gearbox with regulating or shifting steps.

An infinitely-variable increase of the revolution speed in the acceleration mode corresponds to shifting down in a conventional gearbox.

In accordance with a first form of embodiment of the automatic gearbox according to the invention it is provided that during an acceleration phase the rise of the revolution speed is independent from the ratio at least in sections. In this mode of operation there is no constant ratio as is the case for example with a conventional transmission, but there are phases, in which the revolution speed is increased e.g. in infinitely-variable manner, what corresponds to a changing ratio. Aside, also phases can be provided, in which the revolution speed can be increased or reduced in steps. Thereby, it is particularly preferred that during the starting phase of the acceleration mode the revolution speed is brought to a higher revolution speed value in steps, subsequently, the speed can be continuously further increased in infinitely-variable manner. This variant can be called hybrid mode with infinitely-variable increase of the revolution speed.

In accordance with a second alternative embodiment of the invention, however, it may also be provided that the revolution speed can be increased during an acceleration mode with an approximate constant ratio. With this variant the impression of an automatic gearbox with fixed gears is created and during acceleration successively several rises of the revolution speed with a respective constant ratio are passed through, in order to achieve the desired final speed. This variant can be called hybrid mode with fixed gears.

With the hybrid mode with fixed gears it can be provided that after an acceleration phase subject to the position of the acceleration pedal a further stepped rise of the revolution speed or a stepped reduction of the revolution speed can be adjusted. In case by the position of the acceleration pedal it is signalized that the driver desires a stronger speed increase, a second volatile increase of the revolution speed can be effected, which corresponds to shifting down, in order to achieve the desired final speed in a shorter time. In the other case, when the driver activates the acceleration pedal less strongly, a volatile reduction of the revolution speed may be effected, which corresponds to shifting up. Subsequently, the desired final speed can be achieved by a further, however reduced, increase of the revolution speed.

With the automatic gearbox according to the invention it is particularly convenient, if the regulating steps for the increase or reduction of the revolution speed are predetermined as a characteristic line or field, if necessary, subject to further values such as the position of the acceleration pedal or the speed. In this manner a regulating step is associated with each driving situation.

The automatic gearbox according to the invention can be designed and constructed such that in the acceleration mode up to achieving the maximum speed, five to ten, in particular seven regulating or shifting steps are provided. By the multiple volatile or jump-like or step-like reductions of the revolution speed, a particularly sporty and dynamic driving impression is created.

It is not necessary that with the increase and reduction of the revolution speed the same regulating steps are passed through, but also separate regulating steps can be determined.

With the automatic gearbox according to the invention a minimum or maximum revolution speed can be associated with a regulating step, in which the step-wise change of the revolution speed can be triggered when falling below or exceeding the minimum or maximum revolution speed. It is not necessary that the minimum or maximum revolution speeds of the individual regulating steps comply with each other, they can also vary.

A particularly high ease of use can be achieved with the automatic gearbox according to the invention, if the stepped change of the revolution speed can be activated subject to the selected driving program. For instance it may be provided that the stepped change of the revolution speed according to the invention can be activated merely in the driving program S, which means a sporty driving characteristics. In the driving program D, however, the stepped change of the revolution speed cannot be activated and the automatic gearbox behaves like a conventional CVT-gearbox. The appropriate driving program, in which the stepped change of the revolution speed can be activated, can conveniently and expediently be selected by activating a transmission selector lever for the individual driving programs.

It may, however, also be provided that the stepped change of the revolution speed in the acceleration mode can be activated automatically subject to the driving characteristics. For instance, sporty driving characteristics can be detected with the aid of the longitudinal or lateral acceleration and of further parameters. Therewith it is possible to effect the stepped change of the revolution speed according to the invention dependent upon the situation, e.g. if a sporty driving characteristics has been recognized.

It may also be provided that in a conventional automatic gearbox, the stepped change of the revolution speed can be upgraded by an update of the software. The software for the gearbox control is stored in a flash memory, which can be reprogrammed if needed. In this way it is possible to update older automatic gearboxes to the updated state of the software.

The invention further relates to a motor vehicle, which comprises an automatic gearbox of the described type.

BRIEF DESCRIPTION OF THE DRAWINGS

Further advantages and details of the invention will be described in conjunction with the figures and an example embodiment. The figures are schematic drawings, in which.

DETAILED DESCRIPTION OF EXAMPLE EMBODIMENTS OF THE INVENTION

Figure 1:
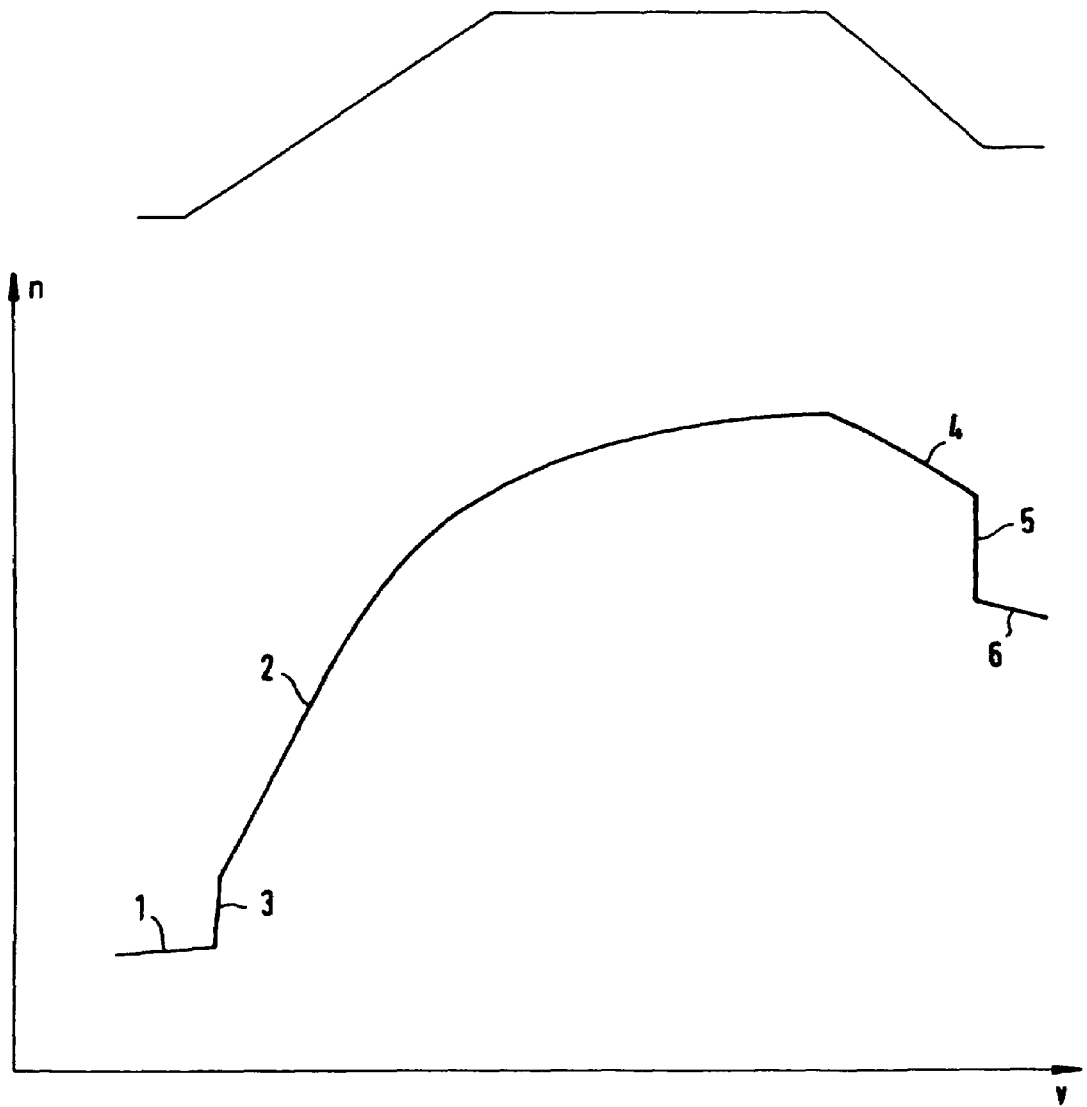
FIG. 1 shows a revolution speed-velocity-diagram of a conventional CVT-automatic gearbox.

FIG. 1 shows a revolution speed-velocity diagram of a conventional CVT-automatic gearbox. The driving speed v is entered on the horizontal axis, the engine or motor revolution speed n on the vertical axis. Above the n-v diagram the respective position of the acceleration pedal is shown.

The automatic gearbox with infinitely-variable ratio, which is built in a motor vehicle, can be operated in a constant speed mode or in an acceleration mode. In the constant speed mode 1 the gearbox has a fixed desired engine revolution speed, which is predetermined subject to the driving situation. If, by activating the acceleration pedal, a distinctly higher performance is required than is necessary for constant driving, then the gearbox or transmission changes into the acceleration mode 2. The constant speed mode 1 permits consumption-favorable or fuel-efficient driving in the steady-state driving operation, in contrast to which the acceleration mode 2 permits spontaneous and dynamic driving.

When shifting into the acceleration mode 2, a speed leap 3 is effected, then the increased revolution speed is further increased in infinitely-variable manner. Above the revolution speed-velocity-diagram, the course of the angle of the acceleration pedal is shown. It can be seen that the revolution speed is increased as long as the driver keeps further pushing down the acceleration pedal. As soon as the acceleration pedal is held constant, merely only a low infinitely-variable increase of the revolution speed is effected, whereby the desired revolution speed is asymptotically approached.

If in the further course the driver takes his foot from the acceleration pedal, the revolution speed in section 4 is lowered in infinitely-variable manner. In the last section of the diagram of the angle of the acceleration pedal, the acceleration pedal is kept constant. Then shifting takes place from the acceleration mode 2 via a revolution speed leap 5 back into the constant speed mode 6.

Figure 2:
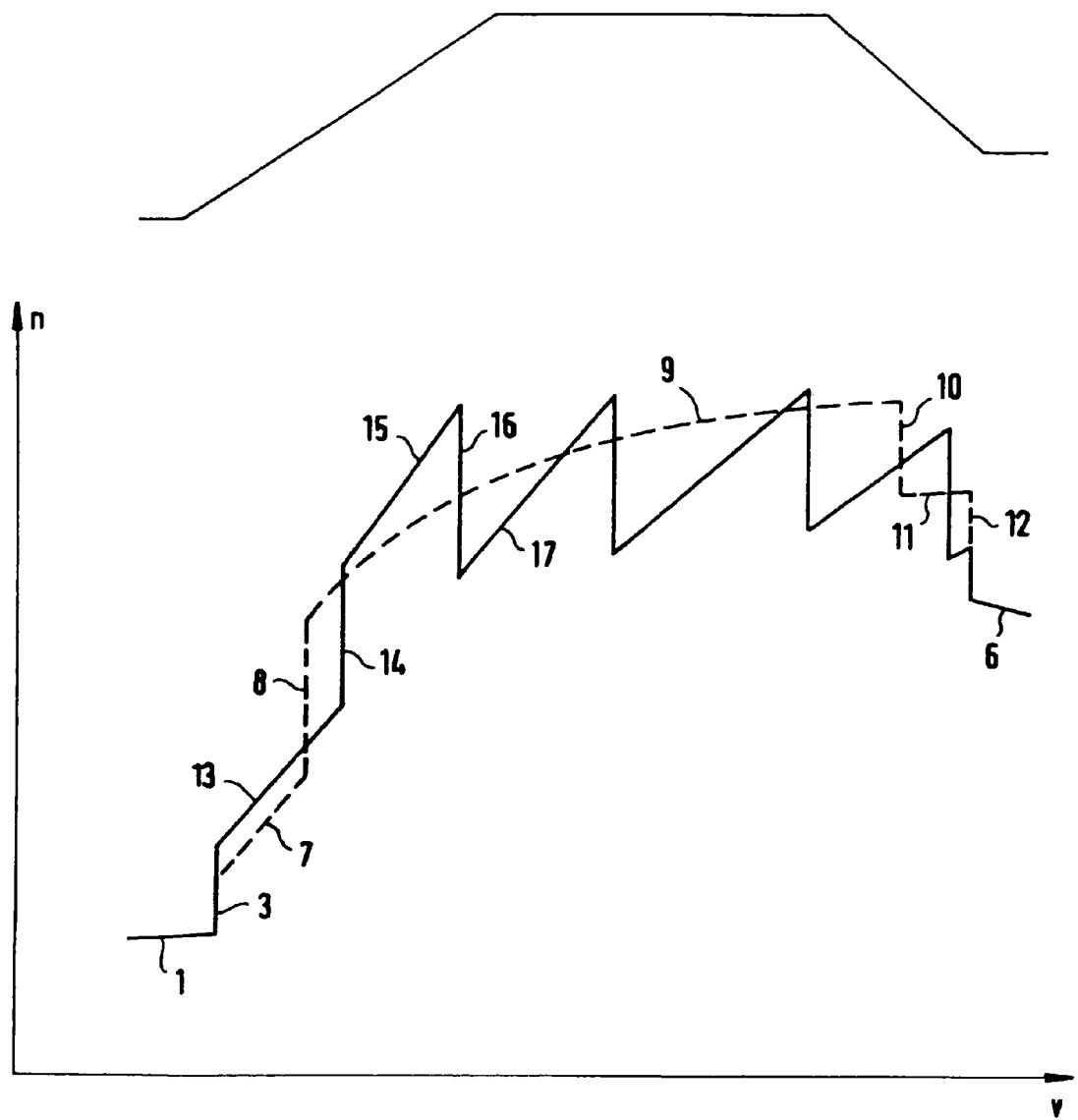
FIG. 2 shows a revolution speed-velocity-diagram of first and second example embodiments of the invention.
Figure 3:
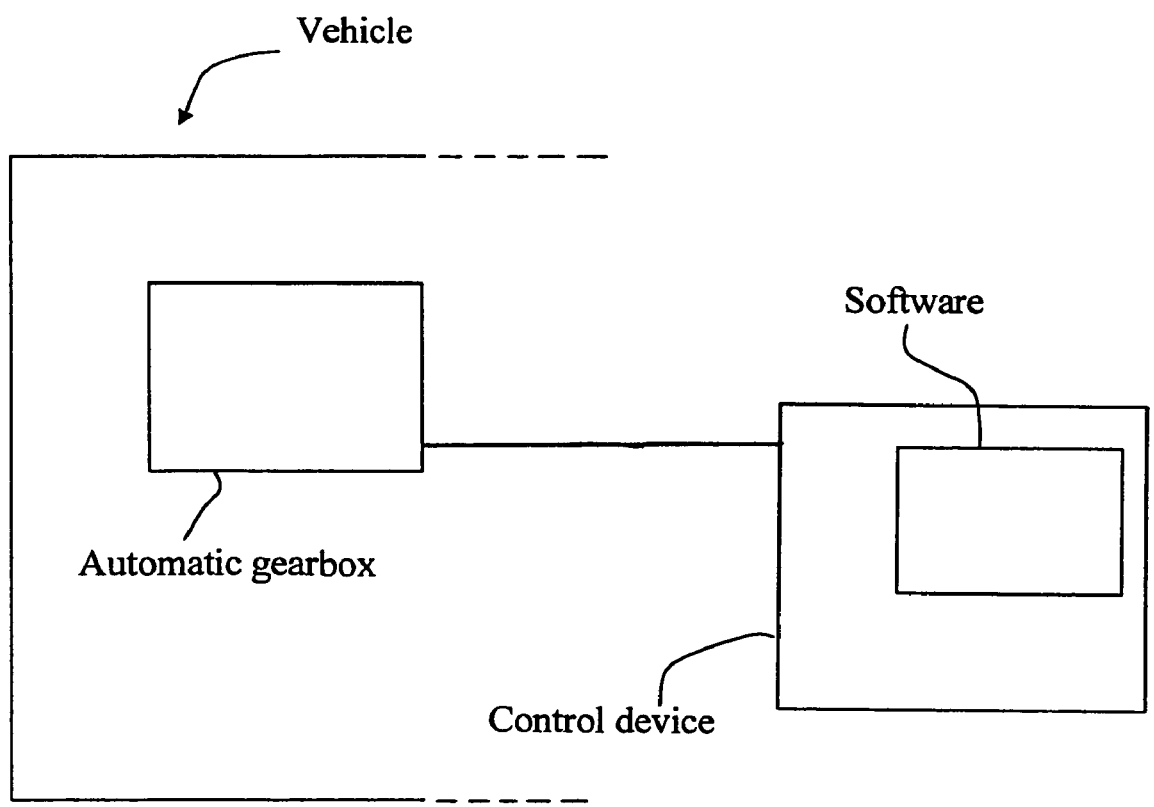
FIG. 3 shows a schematic block representation of a vehicle having an automatic gearbox, as well as a control device and software according to an example embodiment of the invention.

FIG. 2 shows the revolution speed-velocity-diagram of a first and a second example embodiment of the invention. The diagram of the first example embodiment is drawn as a dashed line, while the diagram of the second example embodiment is drawn as a continuous line. These embodiments are carried out in an automatic gearbox of a motor vehicle, and the operating modes of these different embodiments can be embodied or specified through control software being executed in a control device that controls the automatic gearbox, as schematically represented in FIG. 3.

During the transition into the acceleration mode, the constant speed mode 1 and the revolution speed leap 3 correspond to those of FIG. 1. Deviating from FIG. 1, in the first example embodiment shown by the dashed line in FIG. 2, a revolution speed increase occurs due to an increase of the angle of the acceleration pedal, in addition to the infinitely-variable revolution speed increase 7, via a stepped down-shift 8.

Subsequent to the revolution speed increase 7, a revolution speed leap 8 is made, because the driver continuously further pushes down the acceleration pedal. The volatile revolution speed increase corresponds to the shifting down with a conventional manual shifting transmission or with a conventional stepped automatic transmission. The driver has the impression that the gearbox shifts to a lower gear and the vehicle has an improved acceleration.

Then an infinitely-variable increase of the revolution speed 9 is made, which proceeds analogously to the course described in FIG. 1. If the acceleration pedal is released or backed-off to a threshold value, then the revolution speed is lowered via a step 10 in a volatile or leap-like manner, so that the impression of an up-shifting gearbox is obtained. Then the revolution speed in section 11 is slightly increased. If the acceleration pedal is merely held constant, then the automatic gearbox passes into the constant speed mode 6 via a further revolution speed leap 12.

An example embodiment of the hybrid mode with fixed gears is shown in FIG. 2 by the continuous line.

Following the revolution speed leap 3 during the transition from the constant speed mode 1 into the acceleration mode, a revolution speed increase 13 is made with a "virtual constant ratio" as further discussed below. This ratio is adjusted by control of the variator of the automatic gearbox. The ratio must not necessarily comply or correspond with that of a real actual physical stepped gearbox, instead a "virtual" transmission ratio along a characteristic line can be recognized in that its extension does not pass through the zero point or origin of the revolution speed-velocity-diagram. Thus, the transmission ratio may be defined by a linear expression $n=mv+b$, wherein n is the revolution speed, v is the driving speed, m is the slope of the "virtual" transmission ratio characteristic line, and b is the "virtual" positive or negative revolution speed offset from zero for a driving speed of zero with this transmission ratio characteristic. This revolution speed increase 13 corresponds to a gear, which is defined by its minimum revolution speed and its maximum revolution speed. After exceeding the maximum revolution speed for this gear, a revolution speed leap 14 is made, which is felt by the driver like a shifting down. Then the revolution speed is further increased in the next gear 15 up to a maximum value. The subsequent volatile or leap-like revolution speed reduction 16 is felt like an up shift, which is followed by a revolution speed increase 17 in the next gear. The final speed is achieved by several successive shifting and accelerating processes as is the case with a standard manual shifting transmission or a conventional stepped automatic transmission.

This hybrid mode with fixed gears is activated, if the driving program S is selected. As an alternative it can be activated also in the driving program D, if the longitudinal and/or lateral acceleration of the vehicle exceeds a fixed threshold value. In this acceleration mode, particularly sporty driving is possible, which conveys a dynamic driving impression to the driver.

The invention claimed is:

1. An automatic gearbox, for a motor vehicle, with infinitely-variable transmission ratio, which may be operated selectively in a constant speed mode in which a fixed value is prescribed for a desired nominal value of a motor revolution speed of a motor of the motor vehicle, and an acceleration mode in which the desired nominal value of the motor revolution speed can be increased or reduced in plural discontinuous speed range shifting steps with motor revolution speed jumps therebetween characterized in that, in the acceleration mode, respectively in a plurality of said steps, the motor revolution speed is increasable with a respective virtual transmission ratio in which the motor revolution speed and a vehicle velocity of the motor vehicle vary along a respective characteristic line of the respective step that does not pass through a zero point of the motor revolution speed and the vehicle velocity.

2. The automatic gearbox according to claim 1, characterized in that after an acceleration phase, a further stepped motor revolution speed increase or a stepped motor revolution speed reduction can be set dependent on a position of an accelerator pedal of the motor vehicle.

3. The automatic gearbox according to claim 1, characterized in that the shifting steps for increasing or reducing the motor revolution speed are each respectively fixed as the respective characteristic line of motor revolution speed values and vehicle velocity values dependent on a position of an accelerator pedal of the motor vehicle or dependent on the vehicle velocity.

4. The automatic gearbox according to claim 1, characterized in that in the acceleration mode up to achieving a maximum of the vehicle velocity, five to ten of the shifting steps are provided.

5. The automatic gearbox according to claim 4, wherein seven of the shifting steps are provided.

6. The automatic gearbox according to claim 1, characterized in that respective separate ones of the shifting steps are respectively specified for increasing and for reducing the motor revolution speed.

7. The automatic gearbox according to claim 1, characterized in that a minimum motor revolution speed and a maximum motor revolution speed are associated with the respective shifting step, and that when falling below or exceeding the minimum motor revolution speed or the maximum motor revolution speed a stepped motor revolution speed change can be triggered.

8. The automatic gearbox according to claim 1, characterized in that a stepped motor revolution speed change in the acceleration mode can be activated depending on a driving program that is selected.

9. The automatic gearbox according to claim 1, characterized in that a stepped motor revolution speed change in the acceleration mode can be activated dependent on a position of an accelerator pedal of the motor vehicle or dependent on the vehicle velocity or dependent on an acceleration of the motor vehicle.

10. The automatic gearbox according to claim 1, characterized in that a control of a stepped motor revolution speed change is embodied in software in a control device.

11. A vehicle, characterized in that it comprises an automatic gearbox according to claim 1.

12. A continuously variable transmission for a motor vehicle that can drive at a variable vehicle speed and that has a drive motor which can operate at a variable motor rotational speed, said transmission comprising a variator and a controller, wherein:

said variator comprises:
 an adjustable drive element;
 an adjustable driven element; and
 a force transmission element linking said drive element to said driven element for force transmission therebetween;

said controller comprises:
 a control device connected to and adapted to adjust said drive element and said driven element so as to adjust a transmission ratio therebetween through said force transmission element continuously between a lowest transmission ratio and a highest transmission ratio; and
 a memory storing a control program adapted to control said control device so as to adjust said transmission ratio in plural discrete discontinuous steps with discontinuous jumps of said motor rotational speed between successive transmission ratio ranges respectively having a respective virtual transmission ratio of said motor rotational speed relative to said vehicle speed, in which respective virtual transmission ratio said motor rotational speed and said vehicle speed vary along a respective characteristic line that does not pass through a zero point of said motor rotational speed and said vehicle speed.

13. The continuously variable transmission according to claim 12, wherein said characteristic line of said virtual transmission ratio is defined as $n=mv+b$, wherein n is said motor rotational speed, v is said vehicle speed, m is a slope of said characteristic line defined by a change of said motor rotational speed relative to a change of said vehicle speed, and b is an apparent virtual non-zero offset value of said motor rotational speed for a zero value of said vehicle speed along said characteristic line.

14. In a motor vehicle that is adapted to drive at a variable vehicle speed, and that has a motor adapted to operate at a variable motor rotational speed, a continuously variable transmission connected for power transmission between said motor and at least one drive wheel of said motor vehicle adapted to drive at said vehicle speed, and a transmission controller including a memory storing a control program adapted to control continuously variable adjustments of a transmission ratio of said transmission between said motor rotational speed of said motor and said vehicle speed of said drive wheel, an improvement wherein said control program is embodied such that, in at least one operating mode, said transmission ratio is to be adjusted in plural discrete discontinuous steps with discontinuous jumps of said motor rotational speed between successive transmission ratio ranges respectively having a respective virtual transmission ratio of said motor rotational speed relative to said vehicle speed, in which respective virtual transmission ratio said motor rotational speed and said vehicle speed vary along a respective characteristic line defined as $n=mv+b$, wherein n is said motor rotational speed, v is said vehicle speed, m is a slope of said characteristic line defined by a change of said motor rotational speed relative to a change of said vehicle speed, and b is an apparent virtual non-zero offset value of said motor rotational speed for a zero value of said vehicle speed along said characteristic line.

* * * * *

UNITED STATES PATENT AND TRADEMARK OFFICE
CERTIFICATE OF CORRECTION

PATENT NO. : 7,641,586 B2
APPLICATION NO. : 10/580757
DATED : January 5, 2010
INVENTOR(S) : Wild et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 356 days.

Signed and Sealed this

Sixteenth Day of November, 2010

David J. Kappos
*Director of the United States Patent and Trademark Office*